(12) United States Patent
Hubbard et al.

(10) Patent No.: US 9,578,896 B2
(45) Date of Patent: Feb. 28, 2017

(54) APPARATUS FOR SCARIFYING FRUIT USING OPPOSED KNIVES

(75) Inventors: Theodore Hubbard, Walnut Creek, CA (US); Thomas Tealdi, San Mateo, CA (US); Kyle Imatani, San Francisco, CA (US)

(73) Assignee: Ashlock Company, a Division of Vistan Corporation, San Leandro, CA (US)

( * ) Notice: Subject to any disclaimer, the term of this patent is extended or adjusted under 35 U.S.C. 154(b) by 882 days.

(21) Appl. No.: 13/425,541

(22) Filed: Mar. 21, 2012

(65) Prior Publication Data

US 2013/0247739 A1    Sep. 26, 2013

(51) Int. Cl.
*A23N 7/08*    (2006.01)
*A23N 15/02*   (2006.01)

(52) U.S. Cl.
CPC ............. *A23N 15/02* (2013.01); *A23L 19/03* (2016.08); *Y10T 83/0333* (2015.04); *Y10T 83/0341* (2015.04)

(58) Field of Classification Search
CPC ... B26D 3/08; B26D 7/01; B26D 5/16; B26D 7/18; A23L 1/212; A23N 15/02
USPC ................ 83/880, 879, 585, 586, 598, 599; 426/484, 485, 481, 478; 99/563, 565, 99/494, 538, 545, 544, 548, 547, 549, 99/552, 555
See application file for complete search history.

(56) References Cited

U.S. PATENT DOCUMENTS

| | | | |
|---|---|---|---|
| 3,633,641 A | 1/1972 | Tomelleri | 146/28 R |
| 4,871,568 A * | 10/1989 | Cimperman | 426/484 |
| 4,876,954 A | 10/1989 | Cimperman | 99/545 |
| 4,925,691 A | 5/1990 | Cimperman | 426/485 |
| 6,516,713 B1 | 2/2003 | Holmander | 99/541 |
| 6,969,535 B2 * | 11/2005 | Riesenberg et al. | 426/484 |
| 7,781,008 B2 | 8/2010 | Sinha et al. | 426/639 |
| 2004/0142072 A1 | 7/2004 | Schwarz | 426/100 |

* cited by examiner

*Primary Examiner* — Phuong Nguyen
(74) *Attorney, Agent, or Firm* — Alfred A. Equitz

(57) ABSTRACT

A method and apparatus for scarifying fruit by advancing at least one pair of opposed knives contemporaneously into an article of fruit (typically a frozen cranberry or other article of frozen fruit) through at least two locations on the surface of the fruit, such that none of the knives advances so far into the fruit that its tip protrudes out from the fruit. In embodiments which scarify frozen cranberries, each of the knives typically penetrates not more than about 7 mm, or in some cases not more than about 1 mm or 2 mm into the fruit. In some embodiments, each knife has a concave distal surface (for fitting against a convex article of fruit) with a pin protruding distally (e.g., by an amount in the range from about 1 mm to about 7 mm) from the distal surface.

16 Claims, 6 Drawing Sheets

US 9,578,896 B2

APPARATUS FOR SCARIFYING FRUIT USING OPPOSED KNIVES

FIELD OF THE INVENTION

The invention relates to methods and apparatus for scarifying fruit (e.g., frozen cranberries or blueberries) using at least one pair of opposed knives. In typical embodiments, the inventive method and apparatus employs a pair of opposed, cam-driven knives to piece the surface of an article of fruit.

BACKGROUND OF THE INVENTION

Throughout this application, including in the claims, the term "knife" is used in a broad sense to denote a sharp object (e.g., a punch or sharp-tipped object) capable of scarifying the surface of an article of fruit.

Throughout this application, including in the claims, the expression that two or more actions occur "contemporaneously" denotes that the actions occur during overlapping time intervals, or simultaneously, or during time intervals that nearly overlap. For example, advancing two knives "contemporaneously" into an article of fruit such that neither of the knives advances so far into the fruit that its tip protrudes out from the fruit assumes that one knife pierces the fruit at a time "T1" and ceases to advance at a later time "T2," and that the other knife pierces the fruit at a time "T3" and ceases to advance at a time "T4," where T4 is later than T3. Herein the expression "advancing two knives contemporaneously" into an article of fruit (such that neither of the knives advances so far into the fruit that its tip protrudes out from the fruit) can denote advancing the knives simultaneously into the fruit (so that T1 is at least substantially equal to T3, and T2 is at least substantially equal to T4), or advancing the knives such that at least a portion of the interval from T1 to T2 occurs simultaneously with at least a portion of the interval from T3 to T4 (which could occur even if one of the knives begins to retract out from the fruit before the other knife ceases to advance into the fruit), or advancing the knives such that the interval from T1 to T2 occurs before (does not overlap) the interval from T3 to T4 but the difference between T3 and T4 is very small relative to the smaller of (T4−T3) and (T2−T1).

Throughout this application, including in the claims, the term "horizontal" denotes an arbitrary direction (which can be, but is not necessarily, a direction perpendicular to the earth's gravitational field) and the term "vertical" denotes a direction perpendicular to a specific "horizontal" direction. For example, preferred embodiments of the inventive apparatus have elements which define cam tracks and which rotate as a unit with a "horizontally" oriented drive shaft. As the elements rotate, the cam tracks cause knives to advance and retract horizontally. The drive shaft's longitudinal axis is preferably oriented perpendicularly to the earth's gravitational field (since this orientation allows gravity to pull fruit fragments and/or juice perpendicularly away from the knives of the inventive apparatus during operation), but it need not be and is not in some implementations of the invention.

It is often commercially useful to scarify (make at least one shallow cut in, or otherwise pierce) the surface (outer membrane or skin) of an article of fruit. For example, it is commercially useful to scarify the surfaces of frozen cranberries so that sugar can be added efficiently to the scarified cranberries (typically by immersing the scarified cranberries in sugar solution). Unless the outer membrane of a cranberry is scarified before the cranberry is immersed in sugar solution, sugar cannot efficiently be infused into the cranberry by immersion of the fruit in sugar solution.

U.S. Patent Application Publication No. 2004/0142072, published Jul. 22, 2004, describes a conventional method and apparatus for scarifying frozen cranberries and subsequently infusing sugar into the scarified cranberries. The apparatus employs a tapered punch to pierce each frozen cranberry, either completely (with the punch entering a first side of the fruit and advancing all the way through the fruit until its tip protrudes from the fruit's opposite side, and then retracting from the fruit through the first side) or partially (with the punch entering a first side of the fruit and advancing only partway into the fruit so that its tip does not protrude out from the fruit's opposite side, and then retracting from the fruit through the first side of the fruit). The reference teaches that the punch's outer diameter, D, at its untapered end, is typically in the range from about 2 mm to about 4 mm, and that the punch is typically advanced all the way through the fruit and then retracted so as to leave in the fruit an entrance hole of approximate diameter D and an exit hole of diameter less than D.

The inventors have recognized that employing an apparatus (e.g., as described in U.S. Patent Application Publication No. 2004/0142072) to advance a knife (e.g., a punch) completely through a frozen cranberry (or other frozen fruit) can cause the fruit to break into large pieces (or even to explode), and typically, undesirably produces scarified fruit whose size is substantially smaller than that of the original (unscarified) fruit and whose shape is undesirably altered (e.g., made irregular) by the scarification process. The inventors have also recognized that it is inefficient and otherwise undesirable to scarify an article of fruit (e.g., a frozen cranberry) by advancing a single knife (e.g., a punch as described in U.S. Patent App. Publication No. 2004/0142072) through a first side of the fruit, partially into the fruit so that the knife's tip does not protrude out from the fruit's opposite side, and then retracting the knife in the opposite direction out from the fruit through the first side. Such an operation of using a single knife to pierce partway through a fruit (by advancing the knife into a first side of the fruit) scarifies only the first side of the fruit, undesirably leaving the rest of the fruit's skin intact.

The inventors have recognized that it would be desirable to employ multiple knives to scarify an article of fruit by advancing them contemporaneously (e.g., simultaneously) into the fruit through at least two locations on the surface of the fruit (so that the none of the knives advances so far that its tip protrudes out from the fruit), and then retracting the knives out from the fruit. Such an operation of using multiple knives to pierce partway through a fruit efficiently scarifies multiple locations of the fruit's surface.

One type of multi-knife apparatus capable of scarifying fruit is an apparatus designed for pitting and slicing olives, of any of the types described in U.S. Pat. No. 4,925,691, issued May 15, 1990, and in U.S. Pat. No. 4,876,954, issued Oct. 31, 1989, and in U.S. Pat. No. 6,969,535, issued Nov. 29, 2005, all assigned to the assignee of the present invention. In typical implementations of such apparatus, cam-driven pitting and coring knives advance and retract horizontally to pit olives as the knives (and olives) are carried along a generally circular path around a horizontal shaft. Each olive rests in a cup while the olive has its pit removed by an advancing pitting knife, as both the olive and cup translate along a first segment of the circular path around the horizontal shaft. The pitted olive is then sliced by fixed or rotating slicing knives (or water jets) while the pitted olive (still in the cup) translates along a second segment of the circular path around the horizontal shaft. The inventors have recognized that since such an apparatus undesirably advances a knife completely through an article of fruit (the advancing knife's tip exits the fruit so as to eject the pit from within the fruit), use of such an apparatus to pierce a frozen fruit (e.g., a frozen cranberry or blueberry) would be likely to break the frozen fruit (undesirably) into large pieces (or even to cause the fruit to explode), and would likely (undesirably) produce scarified frozen fruit whose size is substantially smaller than that of the original (unscarified) fruit and whose shape is undesirably altered (e.g., made irregular) by the action of the knives on the fruit.

Another type of multi-knife apparatus capable of scarifying fruit is an apparatus designed for pitting olives, of any of the types described in U.S. Pat. No. 4,871,568, issued Oct. 3, 1989, and assigned to the assignee of the present invention. In operation of such apparatus, opposed cam-driven pitting knives (or opposed cam-driven coring knives) advance and retract horizontally to pit olives as the knives (and olives) are carried along a generally circular path around a horizontal shaft. Each olive rests in a cup while the olive has its pit removed by an advancing pitting (or coring) knife, as both the olive and cup translate along a first segment of the circular path around the horizontal shaft. The inventors have recognized that since such an apparatus undesirably advances a knife completely through an article of fruit (the advancing knife's tip exits the fruit so as to eject the pit from within the fruit), use of such an apparatus to pierce a frozen fruit (e.g., a frozen cranberry) would be likely to break the frozen fruit (undesirably) into large pieces (or even to cause the fruit to explode), and would likely (undesirably) produce scarified frozen fruit whose size is substantially smaller than that of the original (unscarified) fruit and whose shape is undesirably altered (e.g., made irregular) by the action of the knives on the fruit.

SUMMARY OF THE INVENTION

The invention is a method and apparatus for scarifying fruit by advancing at least one pair of opposed knives contemporaneously (e.g., simultaneously) into an article of fruit (typically a frozen cranberry, a frozen blueberry, or other article of frozen fruit) through at least two locations on the surface of the fruit, such that none of the knives advances so far into the fruit that its tip protrudes out from the fruit. Each of the knives, after reaching its deepest point of penetration in the fruit, is retracted out from the fruit (in the direction opposite to that in which it advanced into the fruit). In some preferred embodiments which scarify frozen cranberries, each of the knives penetrates not more than a shallow distance (e.g., a distance not greater than about 7 mm, or not greater than about 2 mm in some embodiments, or not greater than about 1 mm in some embodiments) into the fruit. Use of multiple knives in accordance with the invention to pierce partway through a fruit (from multiple locations on the fruit surface) efficiently scarifies the fruit. In some embodiments, the knives are advanced at least substantially simultaneously into the article of fruit, and then begin to retract (e.g., at least substantially simultaneously) and continue to retract completely out from the fruit. In some other embodiments, the knives are advanced (e.g., at least substantially simultaneously) into the article of fruit, and then at least one of the knives retracts (completely or partially) out from the fruit while at least one other one of the knives continues to advance into the fruit, and then all the knives are retracted completely out from the fruit.

In preferred embodiments, an article of fruit (e.g., a frozen cranberry or blueberry) to be scarified is fed into the inventive apparatus and gripped between opposed cam-driven knives. Typically, the knives are advanced (at least substantially simultaneously) into the fruit, and the knives then translate the fruit in a first horizontal direction against a pocket or disc (while the knives and fruit rotate together as a unit about a horizontal axis, so that the knives move the fruit along a generally helical path around the horizontal axis into engagement with the pocket or disc). One of the knives is retracted in the first horizontal direction completely out from the fruit and through a hole defined by the pocket or disc (as the other knife holds the fruit against the pocket or disc, and the pocket (or disc) and the fruit translate along a segment of a circular path around the horizontal axis). The other one of the knives is then retracted (in a horizontal direction opposite to the first horizontal direction) to pull the fruit away from the pocket or disc and into engagement with a fruit stripper (e.g., stripper element 57 of FIGS. 3 and 4, implemented as a fixedly mounted, slotted plate, or element 25 of FIG. 5). As this retracting knife moves the scarified fruit from the pocket (or disc) into engagement with the fruit stripper, the scarified fruit translates along a generally helical path around the horizontal axis. As the knife continues to retract through a slot (or other orifice) in the fruit stripper and out from the fruit, the force exerted on the fruit by the stripper strips the scarified fruit from the knife (and the scarified fruit typically then falls into a product chute or bin). In some preferred embodiments, a product containment element surrounds the area in which fruit is scarified (and in which scarified fruit falls into a product bin) to capture (and direct into the bin) all or substantially all of the fruit, fruit fragments, and fruit juice present in the area.

In preferred embodiments, the inventive apparatus includes a pocket element defining a set of N pockets (e.g., the apparatus includes N pockets mounted to a vertically-oriented plate), and N pairs of cam-driven, opposed knives, where the number N is typically equal to 12. Each pair of knives is axially aligned with a different one of the pockets. The plate is mounted to (and coaxial with) a horizontal drive shaft. The drive shaft is rotatably mounted to a frame and the plate rotates as a unit with the drive shaft. In operation of these embodiments, each fruit article to be scarified is swept by pusher elements (attached to or otherwise driven by a drive chain) or by some other means (such as belts) into a loading area in which the fruit is engaged by two advancing knives. The knives have a common longitudinal axis and advance in opposite directions into engagement with the fruit. The knives then move the fruit horizontally against one of the pockets (while the fruit and knives rotate together as a unit about the drive shaft) and one of the knives retracts out from the fruit through a hole defined by the pocket. The other knife then retracts horizontally, thereby pulling the scarified fruit into engagement with a fruit stripper (which is typically fixedly mounted to the frame). As the retracting knife retracts through the stripper, the scarified fruit is stripped from the knife.

In preferred embodiments, at least some of the knives are spring-loaded to the assembly (e.g., a cam assembly) which drives them, so as to limit the force the knives exert on the fruit when they are advanced into the fruit, to prevent unnecessary damage to (e.g., fragmentation of) the fruit. Each spring-loaded knife is spring-loaded (spring-biased) to the assembly which drives the knife (which may include a cam follower configured to ride on a cam surface shaped to control advancement and retraction of the knife), so that force exerted by a fruit on the knife during advancement of the knife against the fruit can move (e.g., compress) the spring away from its normal state to allow the knife's tip to retract (typically slightly) from its normal (extended) state relative to the rest of the knife, thereby limiting the force exerted by the knife on the fruit, to prevent unnecessary damage to the fruit. As the knife is retracted away from the fruit, the spring can relax toward its normal state, moving the knife tip back to its extended state (relative to the rest of the knife).

In typical embodiments, two axially aligned knives are employed to scarify each article of fruit. Preferably, each knife has a concave distal surface (for fitting against a convex article of fruit) with a pin (typically having a sharp tip) protruding distally (e.g., by an amount in the range from about 1 mm to about 7 mm) from the concave distal surface (e.g., from the center of the concave distal surface). The concave distal surface is sometimes referred to herein as a "cradle." Such a knife can be manufactured by mounting the pin in a hole extending through an elongated member having a concave distal end. Preferably, the pin is spring-loaded (spring-biased) to the assembly which drives the knife (which may include a cam follower configured to ride on a cam surface shaped to control advancement and retraction of the knife), so that force exerted by a fruit on the pin during advancement of the knife against the fruit can move (e.g., compress) the spring away from its normal state, thereby limiting the force exerted by the pin on the fruit, to prevent unnecessary damage to (e.g., fragmentation of) the fruit. As the knife is retracted away from the fruit, the spring can relax toward its normal state.

In typical embodiments, the knives penetrate not more than a shallow distance (e.g., about 1 mm) into the fruit being scarified. For example, to scarify a typical frozen cranberry or frozen blueberry, knife penetration by about 1 mm into the fruit is sufficient to crack the fruit's outer membrane (allowing subsequent infusion of a sugar solution into the scarified fruit) without breaking large fragments away from the main portion of the fruit. In cam-driven knife embodiments, the knife-driving cams are shaped to cause opposed knives to penetrate (into a typically sized fruit) by the preferred amount.

In preferred embodiments, no lubricating oil (or no significant amount of lubricating oil) is allowed to leak from the inventive apparatus into contact with the fruit (before, during, or after scarification). In some embodiments, this is accomplished by positioning the lubricating oil insertion points appropriately (e.g., so that lubricating oil can be dripped on an element which defines a cam, so that the oil flows through a notch in the cam-defining element and drips directly onto the cam surface to be lubricated).

DETAILED DESCRIPTION OF THE PREFERRED EMBODIMENTS

Figure 1:
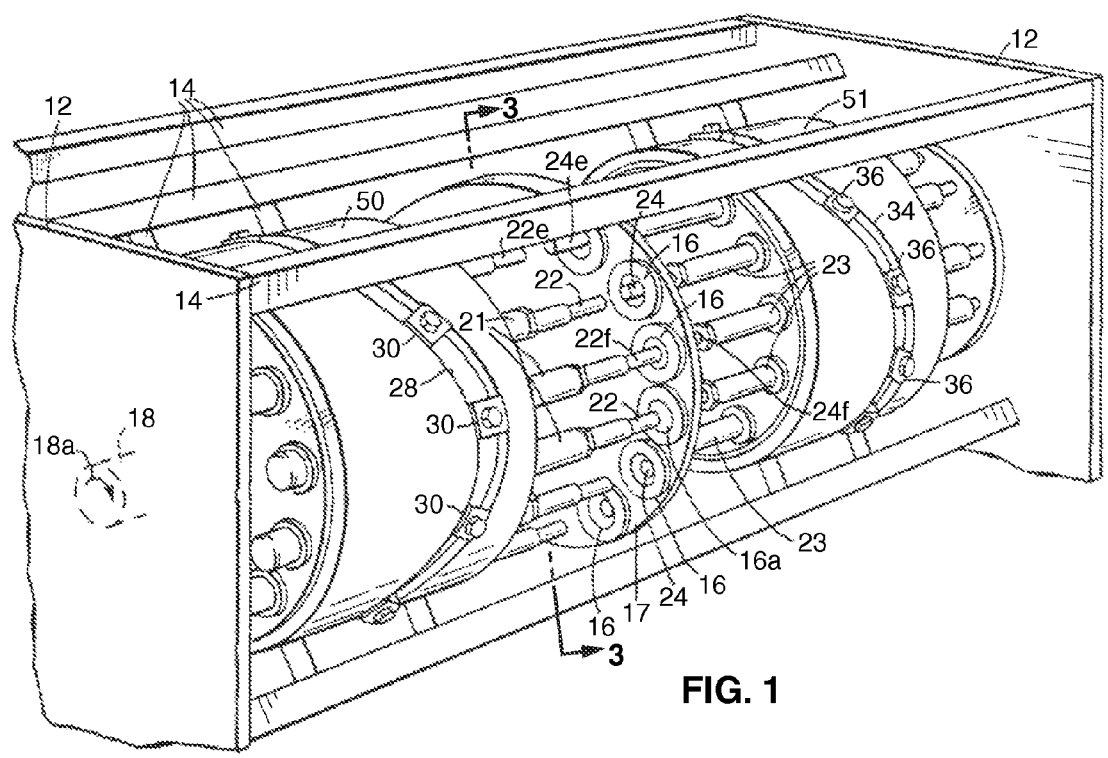
FIG. 1 is a perspective view of a preferred embodiment of the inventive apparatus.

The overall arrangement of preferred embodiments of the inventive apparatus will be described with reference to FIGS. 1-8. As shown in FIG. 1, these embodiments include a drive shaft 18 fixedly attached to a plate 17 through the center of plate 17. The rigid frame of the apparatus includes end plates 12 and rigid frame members 14 between plates 12. Horizontally oriented drive shaft 18 is rotatably attached to end plates 12. In operation, shaft 18 rotates clockwise, in the direction indicated by arrow 18a. When a conventional drive means (not shown) rotates shaft 18, pockets 16 in plate 17 are translated along a circular path in a plane perpendicular to a longitudinal axis (the longitudinal axis of shaft 18). It is contemplated that the inventive apparatus may include any number of pockets 16.

A pair of opposed knives 22 and 24 is provided for each pocket 16. An article of fruit (shown in FIGS. 2 and 5, but not in FIG. 1) may be held between each pair of opposed knives 22 and 24. Each pair of opposed knives 22, 24 (and any fruit held between the knives 22 and 24) is translated along a circular path parallel to the path of the associated one of pockets 16 (the pocket aligned with the opposed knives 22 and 24) as shaft 18 rotates. During a portion of the processing cycle, fruit held between a pair of opposed knives 22 and 24 is pressed against one of pockets 16 by knife 22, while knife 24 retracts away from knife 22 through orifice 16a of pocket 16.

Figure 5:
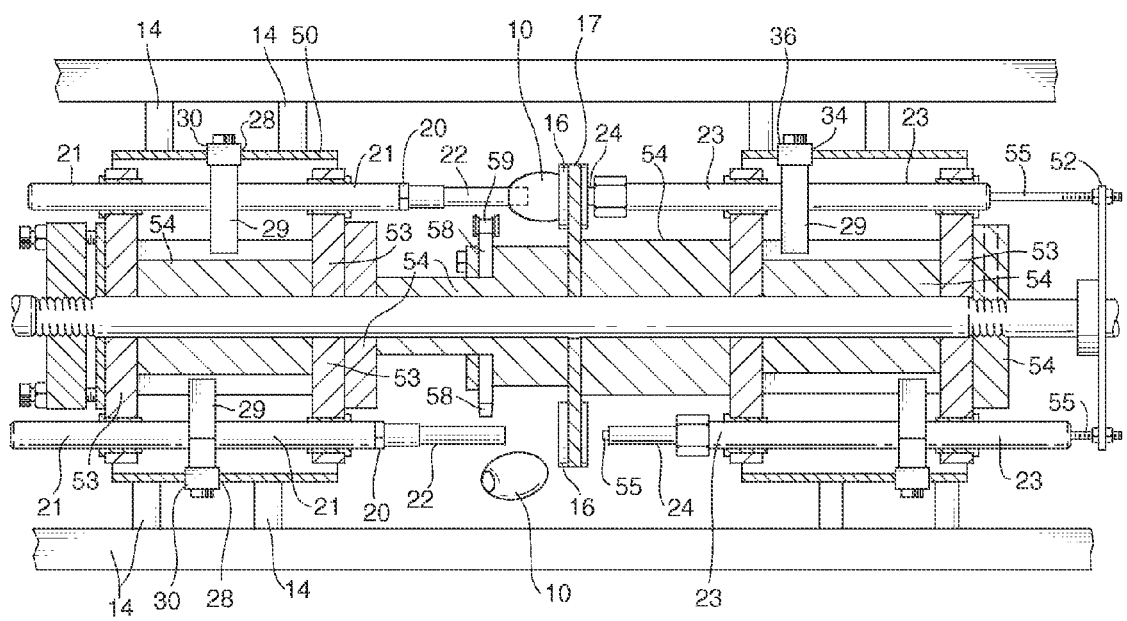
FIG. 5 is a partially elevational, partially cross-sectional view of a portion of the FIG. 1 apparatus.

Each of plunger shafts 21 and 23 is fixedly attached to a pair of members 53 (shown in FIG. 5). Members 53 are in turn fixedly attached to shaft 18. A knife 22 is attached to the end of each of shafts 21 (knives 22e and 22f are identical to the other knives 22). A knife 24 is attached to the end of each of shafts 23 (knives 24e and 24f are identical to the other knives 24). Plunger shafts 21 extend slidably through holes around the periphery of members 53 between plate 17 and one end of the apparatus (the left end, if viewed as in FIG. 5), and plunger shafts 23 extend slidably through holes around the periphery of members 53 between plate 17 and the other end of the apparatus (the right end, if viewed as in FIG. 5).

Knives 22 are typically identical to knives 24, although they need not be. Plate 17 and members 53 are oriented so that each pocket 16 is positioned to receive one of knives 24, and so that each of knives 22 is aligned colinearly with an opposing one of knives 24. As shaft 18 rotates, plate 17 and members 53 rotate as a unit with shaft 18 so that each pocket 16, and the knives 22 and 24 aligned with the pocket, traverse parallel circular paths.

As shaft 18 rotates, and the members (e.g., members 53 and plate 17) fixedly attached to shaft 18 rotate as a unit with shaft 18, rigid frame members 14 and end plates 12 remain stationary. Cylinder 50 and cylinder 51 are fixedly attached to frame members 14, so that they also remain stationary as shaft 18 rotates. Cam track 28 is defined in the side wall of cylinder 50. Cam track 34 is defined in the side wall of cylinder 51. As shaft 18 rotates, cam followers 30 ride in track 28 and cam followers 36 ride in track 34. A member 29 is connected between each cam follower and each of plunger shafts 21 and 23. Thus, when shaft 18 rotates, cam followers 30 and 36, members 29, and shafts 21 and 23 move parallel to the longitudinal axis of shaft 18.

Figure 2:
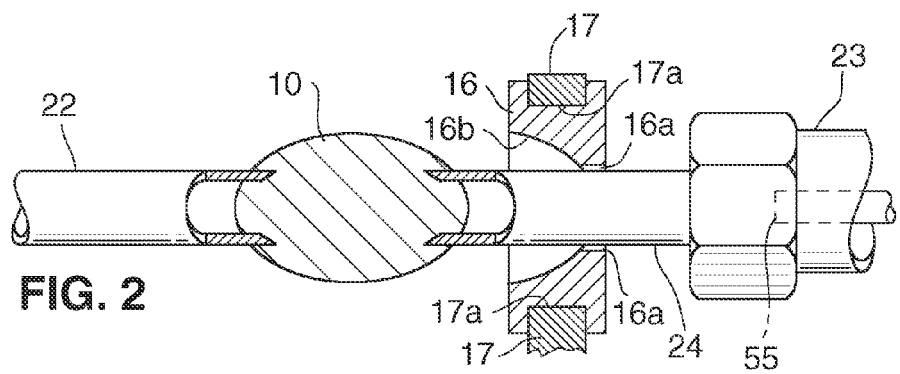
FIG. 2 is a side view, partially elevational and partially cross-sectional, of a portion of the FIG. 1 apparatus including a pair of knives 22 and 24 (implemented to have the shape and structure shown in FIG. 2), and an article of fruit held between the knives.

FIG. 2 is a cross-sectional view of a portion of the FIG. 1 apparatus including a pair of opposed knives 22 and 24, and an article of fruit 10 held between the knives. FIG. 2 represents an early stage in the scarification cycle, in which knives 22 and 24 have been urged together by cam followers 30 and 36, respectively, so as to have penetrated both ends of fruit 10. The position of knives 22 and 24 in FIG. 2 corresponds to the position of the uppermost pair of knives (knives 22e and 24e) in FIG. 1.

As best shown in FIG. 2, each pocket 16 of the apparatus is fixedly attached to plate 17 within an orifice 17a in plate 17. Pocket 16 has a concave surface 16b which is sized and shaped to receive an article of fruit (e.g., a frozen cranberry or frozen blueberry, in typical implementations). It should be appreciated that in some cases, the fruit to be processed in accordance with the invention is fresh, previously frozen, thawed, or partially frozen, rather than frozen. In FIG. 2, fruit 10 has not yet been pushed into engagement with surface 16b. Pocket 16 is generally ring-shaped, and has a central axis of symmetry aligned colinearly with the common longitudinal axis of opposed knives 22 and 24. Pocket 16 also has an inner cylindrical surface 16a which defines an orifice dimensioned and oriented to receive knife 24 as the knife 24 advances and retracts parallel to its longitudinal axis. Preferably, pocket 16 is formed of a resilient material such as rubber.

FIG. 5 is a partially elevational, partially cross-sectional side view of the FIG. 1 apparatus. The upper plunger shaft 23 in FIG. 5 has been driven by the associated cam follower 36 and member 29 connected thereto into a position fully extended to the left. The upper plunger shaft 21 in FIG. 5 has been driven by the associated cam follower 30 and member 29 connected thereto into a position fully extended to the right. Thus, both ends of the upper fruit article 10 in FIG. 5 have been simultaneously penetrated (to a shallow depth) by upper knife 22 and upper knife 24, and the article of fruit has been translated into contact with upper pocket 16.

The lower plunger shaft 23 in FIG. 5 has been driven by the associated cam follower 36 and member 29 connected thereto into a position fully retracted to the right. The lower plunger shaft 21 in FIG. 5 has been driven by the associated cam follower 30 and member 29 connected thereto into a position retracted to the left. Thus, the lower knife 24 has been retracted away from the lower (scarified) article of fruit 10, and the lower knife 22 has been retracted to allow lower fruit 10 to fall away from lower pocket 16.

Rotating members 53 rotate plunger shafts 21 and 23 through a cylindrical region surrounding shaft 18. As shafts 23 rotate, they translate to the left and to the right as cam followers 36 ride in cam track 34. As shafts 21 rotate about shaft 18, they translate to the right and to the left as cam followers 30 ride in cam track 28.

In implementations in which knives 24 have hollow, cylindrical shape (as shown in FIG. 2), the apparatus can include ejector rods 55 and member 52. Each of ejector rods 55 is slidably positioned inside of one of plunger shafts 23 and is rigidly attached to member 52. As shaft 18 rotates, it causes member 52 to rotate relative to stationary frame members 14. The relative movement between plungers 23 and ejector rods 55 strips any fruit fragment (that may cling to the retracting knife 24) from knife 24 as plunger 23 is retracted. In other implementations (e.g., in which knives 24 are not hollow, for example, in which they are shaped as in FIG. 4 or FIG. 7), ejector rods 55 and member 52 are omitted.

As shaft 18 is rotated by a conventional drive means (not shown), plate 17 and members 52, 53, and 54 rotate as a unit with shaft 18. However, frame members 14 and cylindrical members 50 and 51 (and end plates 12 shown in FIG. 1), remain stationary.

Figure 3:
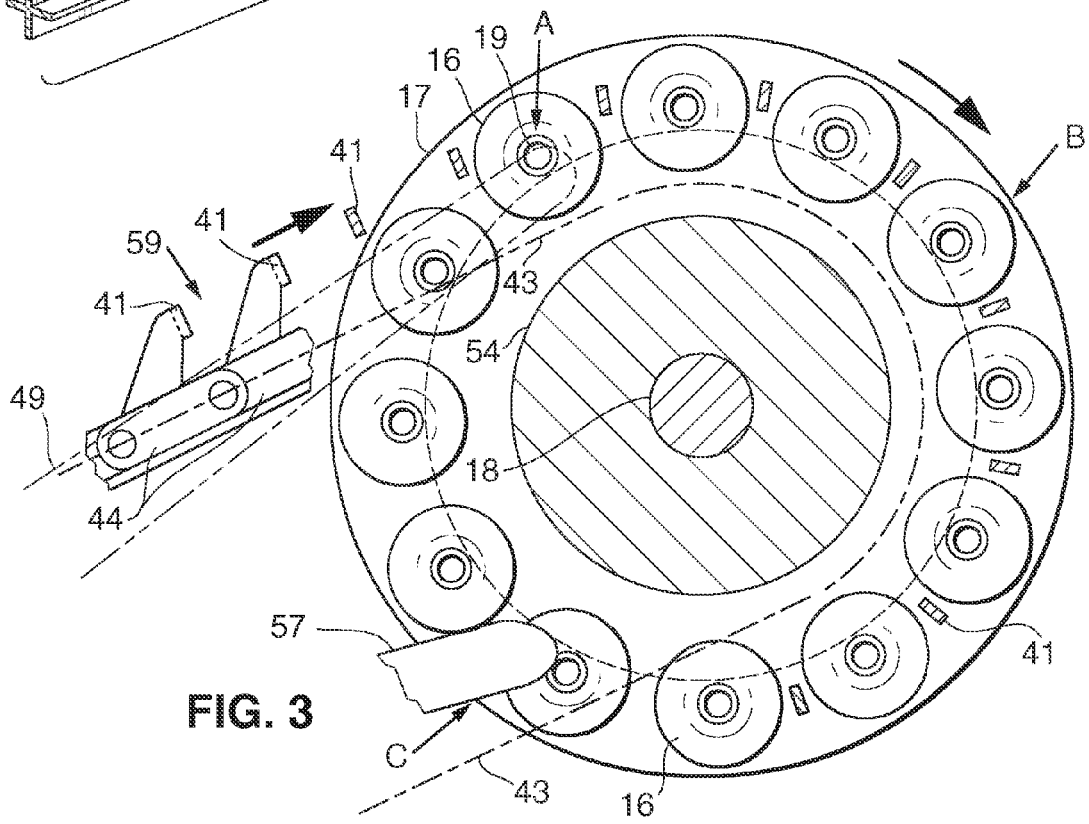
FIG. 3 is a cross-sectional view taken along line 3-3 of FIG. 1.

We next describe a loading assembly comprising conveyer 59 (shown in FIGS. 3 and 5, but not shown in FIG. 1) for loading articles of fruit between pairs of opposed knives 22 and 24. Conveyor 59, which includes a plurality of chain links 44 (two of which are shown in FIG. 3), extends around sprocket 58 (shown in FIG. 5 but not FIG. 3) which is adjustably mounted on member 54 in front of plate 17 (in the FIG. 3 view). Conveyor 59 is only partially shown in FIG. 3, since if it were completely shown it would obscure plate 17 and various other elements in FIG. 3. As shaft 18 rotates clockwise (viewed as in FIG. 3), member 54 rotates plate 17 clockwise, and causes conveyor 59 to rotate clockwise around path 43 (of FIG. 3). Conveyor 59 is thus translated around a closed path by sprocket 58, which rotates as a unit with shaft 18. A conventional loading means (not shown) deposits fruit on conveyor 59. Conveyor 59 supports each article of fruit until the fruit is gripped and penetrated by a pair of opposing knives 22 and 24. Conveyor 59 is shown in FIG. 5 in a position displaced to the left from plate 17 and upper article of fruit 10. Thus, it will be appreciated that the tips of upper knives 22 and 24 must have spanned conveyor 59 at the moment when they first engaged the upper fruit 10, and that to have reached the position shown in FIG. 5, upper knives 22 and 24 both have been translated to the right with respect to conveyor 59 since the time they first engaged the upper fruit article 10.

Any means can be employed for loading fruit articles onto conveyor 59 and/or to load fruit articles between opposed scarifying knives. In the preferred embodiment, conveyor 59 pushes fruit up inclined ramp 49 (shown in phantom view in FIG. 3) to load the fruit into positions such that they can be engaged between opposed knives. Alternatively, a conveyor belt can be employed as a means for loading fruit (e.g., for loading fruit articles into positions in which they can be engaged between opposed knives). Similarly, any means can be employed for collecting the end product (scarified fruit and optionally also fruit fragments and/or juice) from the apparatus after the slicing operation.

Each link 44 of conveyor 59 has a pusher arm 41 that extends perpendicularly out from the link (parallel to the longitudinal axis of shaft 18). As shaft 18 (and thus conveyor 59) rotates, articles of fruit 10 are fed onto inclined ramp 49 (shown in phantom view in FIG. 3). Each of the pusher arms 41 is positioned relative to ramp 49 to be capable of sweeping one of the fruit articles along ramp 49 toward and then (at station A of FIG. 3) between one of knives 24 and the corresponding one of knives 22, while cam followers 30 and 36 cause the knives 22 and 24 to advance horizontally toward the fruit. The knives 22 and 24 continue to advance toward each other until they engage opposite ends of the fruit and until both knives 22 and 24 penetrate into the fruit flesh (typically, frozen flesh). After knives 22 and 24 have advanced contemporaneously into engagement with the fruit, one or both of the knives 22 and 24 translate the fruit along its processing path, although the pusher arm 41 may in some implementations exert some force on the fruit tending to push the fruit around the longitudinal axis of shaft 18. In preferred operation of preferred implementations, pusher arm 41 does not exert force on the fruit after opposite ends of the fruit have been engaged by a pair of knives 22 and 24.

Before knives 22 and 24 translate the fruit into engagement with any of pockets 16, knives 22 and 24 have made shallow cuts in opposite ends of the fruit. Knife 22 then continues to advance while knife 24 retracts, until the fruit is pushed against one of pockets 16. Knife 22 then continues to advance while knife 24 retracts out of engagement with the fruit and pocket 16 prevents the fruit from moving horizontally (at station B of FIG. 3). This operation occurs while the fruit and pocket 16 translate along a segment of a circular first path around the longitudinal axis of shaft 18 (station B is a point along such segment of the first path).

After knife 24 is retracted out from the fruit in the pocket 16, the knife 22 (on which the scarified fruit is impaled) retracts away from the pocket 16, thereby pulling the scarified fruit away from pocket 16 and toward a stripping element (57). The knife 22 moves the scarified fruit into engagement with stripping element 57 (at station C of FIG. 3) and then retracts away from the scarified fruit (e.g., through a slot in the element 57). This operation typically occurs while the fruit and knife 22 translate along a segment of a circular second path around the longitudinal axis of shaft 18 (station C is a point along such segment of the second path). Typically, this second path is in a vertical plane between plate 17 and the right ends of plungers 21 (viewed as in FIG. 5), and the stripping element 57 is mounted along the second path. The above-mentioned circular first path is thus in a vertical plane offset (toward the right, viewed as in FIG. 5) from the plane of the second path.

Product stripping element 57 (shown in FIG. 3) is typically employed to actively strip scarified fruit from the inventive apparatus, but is omitted in some embodiments (e.g., embodiments which rely on the scarified fruit simply falling into a product chute or bin when the last knife retract therefrom). Rather than a fixed stripping element (e.g., a stripper bar, or set of bars, or slotted plate), some embodiments employ other product stripping means (for example, fluid jets, which could be jets of water or air) to strip any fruit or fruit fragments that cling to the inventive apparatus (e.g., to knife 22) after the scarification operation.

Figure 6:
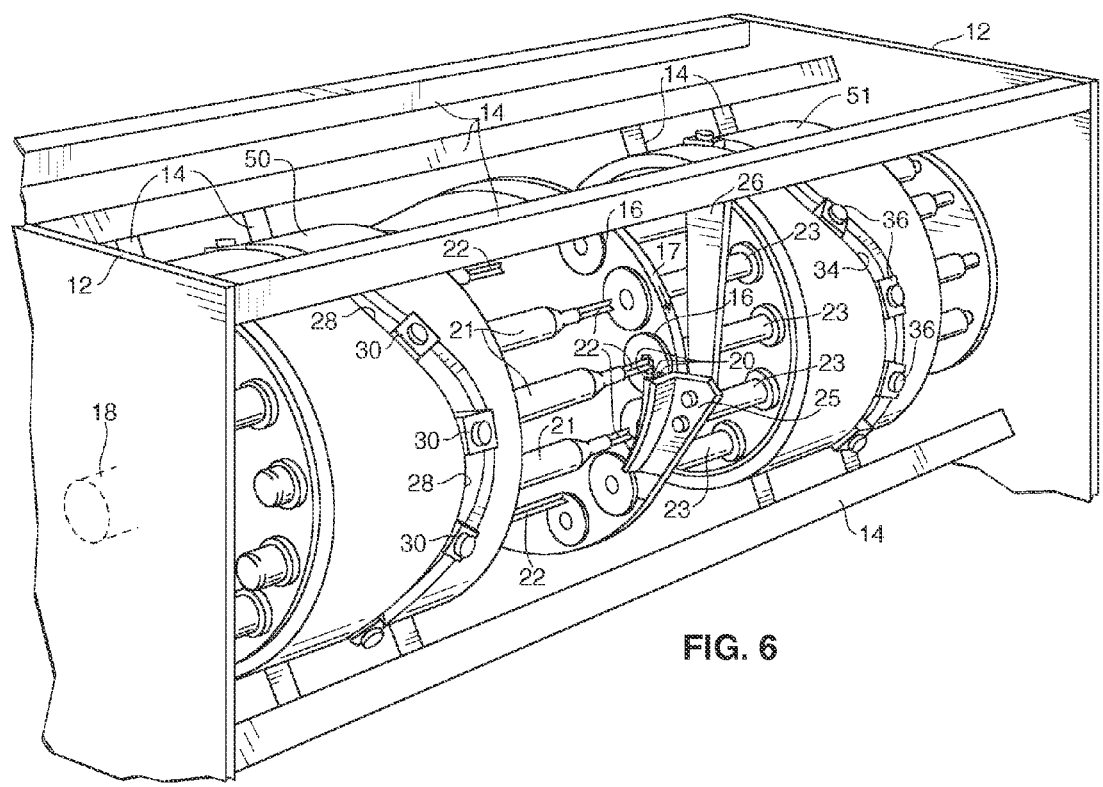
FIG. 6 is a perspective view of another embodiment of the inventive apparatus.

An alternative stripping element (element 20, 25) is employed in the FIG. 6 embodiment of the inventive apparatus. The FIG. 6 embodiment is identical to that of FIG. 1 except in that the only product stripping element of the FIG. 6 embodiment (other than each pocket 16) is the stripping element including blades 20, and mount 25 for holding the blades 20. Mount 25 is fixedly attached by stationary member 26 to one of frame members 14. Mount 25 is positioned relative to the path of pockets 16 so that blades 20 engage the scarified fruit in each pocket as the pocket rotates past mount 25. With the fruit engaged with blades 20, knife 22 retracts out from within the fruit. The fruit is then free to fall into a product chute (or bin), and the retracted knife 22 and the pocket continue to rotate past the stripping element.

Figure 4:
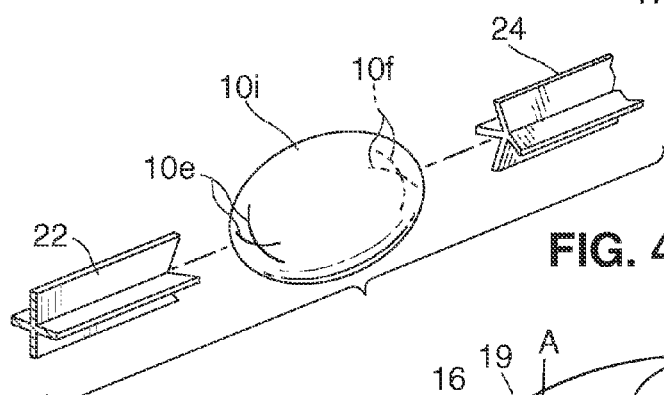
FIG. 4 is a perspective view of a scarified fruit article that has been processed by the apparatus of FIG. 1, with knives 22 and 24 of the apparatus implemented to have the shape shown in FIG. 4.
Figure 7:
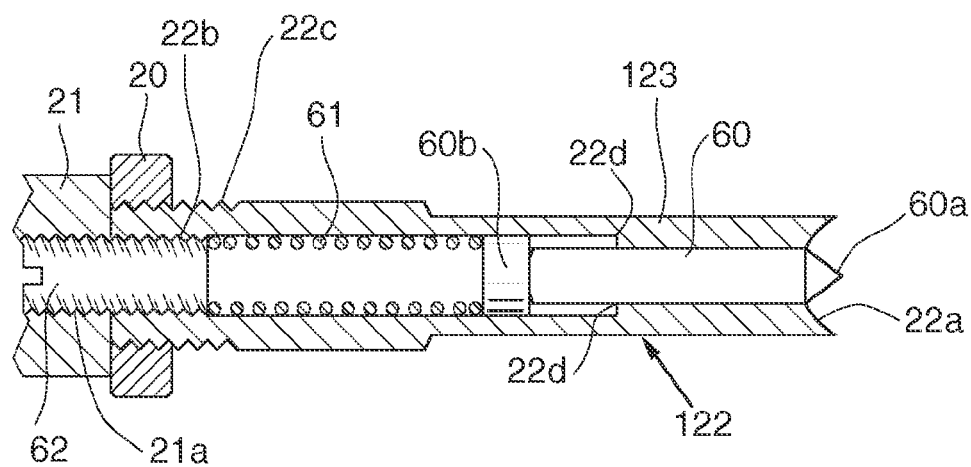
FIG. 7 is a cross-sectional view of a preferred embodiment of a scarifying knife for use in the inventive apparatus (e.g., a preferred implementation of knife 22 and/or knife 24 of the FIG. 1 apparatus).

In a preferred implementation of the apparatus of FIGS. 1 and 5, the tips of scarifying knives 22 and 24 have the cross-shaped (or "fluted") profile shown in FIG. 4 (with four radially extending fins). In other embodiments, the scarifying knives have another shape and/or structure (e.g., a star-shaped profile with three, five, six, or eight fins, another fluted cross-section, or an annular cross-section). For example, in some preferred embodiments of the inventive apparatus the scarifying knives (e.g., knives 22 and 24) have shape and structure as shown in FIG. 7. In some other embodiments, the scarifying knives are hollow and cylindrical (e.g., knives 22 and 24 are implemented to have the shapes shown in FIG. 2).

In the FIG. 4 embodiment, the knives 22, 24 of each pair of opposed scarifying knives are matching in the sense that each has a cross-shaped (or star-shaped) profile. Knives 22 and 24 in FIG. 4 each have four radial blades (fins) defining identical cross-shaped profiles, although in variations on the embodiment of FIG. 4, they may alternatively have more than four or less than four radial blades. Knife 22 of FIG. 4 would be mounted on one of plunger shafts 21, and knife 24 would be mounted on one of plunger shafts 23 of the FIG. 1 apparatus.

FIG. 4 includes a perspective view of a scarified fruit article 10i whose surface has been scarified by the shown opposed knives 22 and 24. In FIG. 4, knives 22 and 24 have already retracted from fruit 10i after contemporaneously penetrating both ends of the fruit. Knife 24 produced wound (scar) 10f in fruit 10i, and knife 22 produced scar 10e in the opposite end of the fruit.

In preferred embodiments, each scarifying knife (e.g., each of knives 22 and 24 in the FIG. 1 or FIG. 8 apparatus) has a concave distal surface (for fitting against a convex article of fruit) with a pin (typically having a sharp tip) protruding distally (e.g., by about 1 or 2 mm, or by an amount in the range from about 1 mm to about 7 mm in some implementations) from the center of the concave distal surface. The concave distal surface is sometimes referred to herein as a "cradle." An example of such a knife is knife 122 of FIG. 7, which has a concave distal surface 22a (a cradle for fitting against a convex article of fruit) and a pin 60 (having sharp tip 60a) protruding distally (typically by an amount in a range from about 1 mm to about 7 mm, for scarifying frozen cranberries or blueberries having diameter in the range from about 10 mm to about 20 mm, or by an amount in a range from about 1 mm to about 2 mm in some preferred embodiments) from the center of cradle 22a.

Knife 122 is manufactured by machining a hole through elongated member 123, which has a concave distal end and mounting pin 60 in the hole. Member 123 typically has outer diameter in the range from about 2 mm to about 4 mm, when knife 122 is intended for use for scarifying frozen cranberries. Pin 60 is spring-loaded (spring-biased) to the assembly which drives knife 122 (i.e., the assembly comprising plunger shaft 21 or 23, cam follower 30 or 36, and member 29 connected between the cam follower and plunger shaft, when each of knives 22 and 24 of the FIG. 1 apparatus is implemented as knife 122). The spring-loading is such that force exerted by a fruit on pin 60 during advancement of knife 122's tip 60a against the fruit can move the spring (i.e., can compress spring 61 of FIG. 7) away from its normal state to allow pin 60 (and thus the knife's tip 60a) to retract (typically slightly) from its normal (extended) state relative to the rest of knife 122, thereby limiting the force exerted by knife 122 on the fruit, to prevent unnecessary damage to the fruit. As knife 122 is retracted away from the fruit, spring 61 can relax back to its normal state, moving knife tip 60a back to its extended state (relative to the rest of knife 122) and biasing pin 60 in its normal, extended position relative to the rest of knife 122.

More specifically, spring 61 and pin 60 are mounted within member 123 of knife 122. Pin 60 has an inner end portion 60b opposite its outer end which defines tip 60a. Knife 122 is assembled as follows: pin 60 is inserted within the central bore of member 123 (with shoulder 22d of the bore retaining the end portion 60b of pin 60 within the bore, spring 61 is then inserted within the central bore of member 123, set screw 62 is then screwed into internal threaded portion 22b of member 123, jam nut 20 is screwed onto the outer threaded portion 22c of member 123, and then the outer threaded portion of screw 62 is screwed into threaded end portion 21a of plunger shaft 21 (or a similar threaded end portion of plunger shaft 23). Of course, alternative means may be employed for attaching knife 122 to plunger shaft 21 (or 23) and retaining spring 61 within the volume bounded by knife 122, pin 60, and the plunger shaft. When spring 61 is fully extended, inner end portion 60b engages with shoulder 22d of member 123, so that pin 60 is retained within knife 122.

Figure 8:
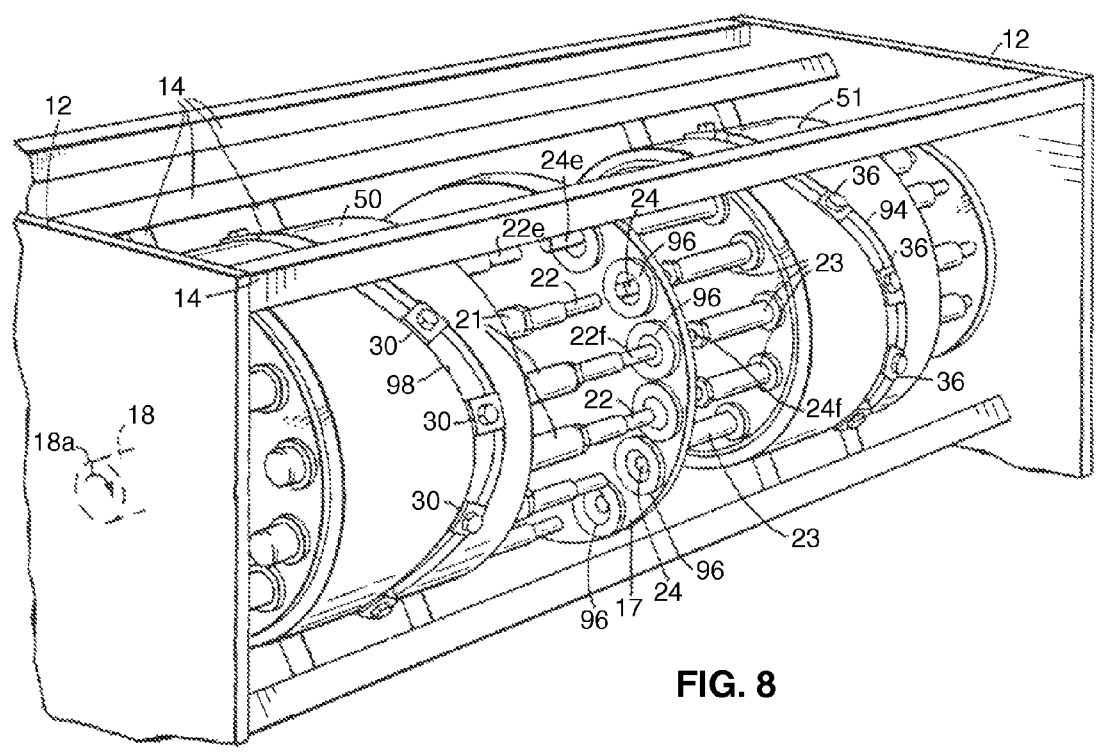
FIG. 8 is a perspective view of another preferred embodiment of the inventive apparatus.

An alternative cam arrangement for driving scarifying knives, and alternative elements (elements 96 of FIG. 8) for stripping scarified fruit from scarifying knives, are employed in the FIG. 8 embodiment of the inventive apparatus. The FIG. 8 embodiment is identical to that of FIG. 1 except in that cam track 94 (replacing cam track 34 of FIG. 1) has slightly different shape than track 34 of FIG. 1, in that cam track 98 (replacing cam track 28 of FIG. 1) has slightly different shape than track 28 of FIG. 1, and in that annular discs 96 replace pockets 16 of FIG. 1.

In the FIG. 8 apparatus, cam track 98 is defined in the side wall of cylinder 50, and cam track 94 is defined in the side wall of cylinder 51. As shaft 18 rotates, cam followers 30 ride in track 98 and cam followers 36 ride in track 24.

In operation of the FIG. 8 apparatus, an article of fruit (e.g., a frozen cranberry or blueberry) to be scarified is fed into the apparatus and gripped between a pair of opposed cam-driven knives 22 and 24 (which can be implemented in any of the ways that knives 22 and 24 of FIG. 1 can be implemented). In one implementation, cam tracks 94 and 98 are shaped so that, as shaft 18 rotates: opposed knives 22 and 24 are advanced (at least substantially simultaneously) into the fruit, to scarify the fruit; the knives then translate the fruit in a first horizontal direction against one of discs 96 (while the knives and fruit rotate together as a unit about a horizontal axis, so that the knives move the fruit along a generally helical path around the horizontal axis into engagement with the disc 96); and knife 24 is then retracted in the first horizontal direction completely out from the fruit and through a hole (orifice) defined by the disc 96 (as knife 22 holds the fruit against the disc, and the fruit and disc translate along a segment of a circular path around the horizontal axis); and knife 22 is then retracted (in a horizontal direction opposite to the first horizontal direction) to pull the fruit away from the disc 96 and into engagement with a fruit stripper (e.g., stripper element 57 of FIG. 3, implemented as a fixedly mounted, slotted plate, or element 25 of FIG. 6).

Figure 9:
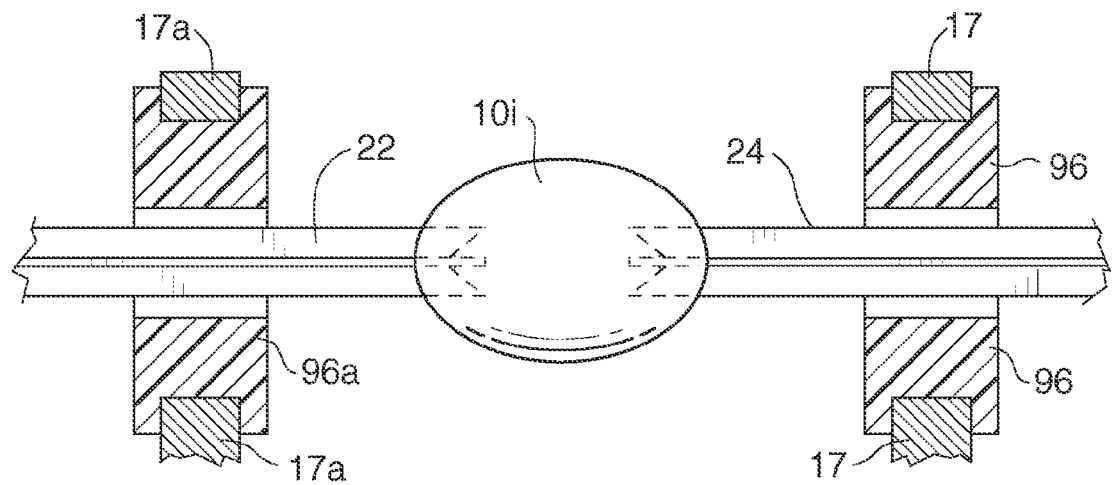
FIG. 9 is a side view, partially elevational and partially cross-sectional, of a portion of a modified version of the FIG. 8 apparatus including a pair of knives 22 and 24 (implemented to have the shape and structure shown in FIG. 9), and an article of fruit held between the knives.

Preferably, the fruit stripper is simply a second plate (similar or identical to plate 17) fixedly mounted to shaft 18 between plate 17 and cylinder 50. An example of such second plate is plate 17a of FIG. 9. FIG. 9 is a cross-sectional view of a portion of a modified version of the FIG. 8 apparatus, which is identical to the FIG. 8 apparatus except in that it includes a second plate 17a mounted to shaft 18 between plate 17 and cylinder 50. The second plate which implements the fruit stripper (e.g., plate 17a of FIG. 9) defines orifices, each orifice aligned colinearly with the common longitudinal axis of a pair of opposed knives 22 and 24. Knives 22 are free to translate (advance or retract) through the orifices of the second plate. For example, plate 17a includes discs 96a mounted around its periphery (each disc corresponding to one of discs 96 of plate 17), each of these discs 96a defining a central orifice which extends through the disc. Each disc 96a is typically made of hard plastic, and plate 17a is typically made of metal. As one of knives 22 is retracted (with a scarified fruit article impaled on it) to pull the fruit away from plate 17, knife 22 retracts through an orifice defined by plate 17a, but the fruit cannot pass through the orifice and is thus stripped by plate 17a (including discs 96a) from the retracting knife 22.

FIG. 9 shows a portion of the above-mentioned, modified version of the FIG. 8 apparatus (elements 22, 24, 17, and 96 of which are identical to the identically numbered elements of the FIG. 8 apparatus) which includes a pair of opposed knives 22 and 24, and an article of fruit 10i held between the knives. FIG. 9 represents an early stage in the scarification cycle, in which knives 22 and 24 have been urged together by cam followers 30 and 36, respectively, so as to have penetrated both ends of fruit 10i. The position of knives 22 and 24 in FIG. 9 corresponds to the position of the upper-most pair of knives (knives 22e and 24e) in FIG. 8.

As shown in FIG. 9, each disc 96 of the apparatus is fixedly attached to plate 17 within an orifice in plate 17. Each disc 96 is typically made of hard plastic, and plate 17 is typically made of metal. Each disc 96 is annular, having flat front and rear surfaces (the left and right surfaces as viewed in FIG. 9) and a central orifice extending through it. The diameter of disc 96's central orifice is sufficiently large so that knife 24 is free to advance and retract through the orifice, but sufficiently small so as to prevent an article of fruit (having size within an expected range) impaled on knife 24 from translating through the orifice. Disc 96 is mounted to plate 17 with its central axis of symmetry aligned colinearly with the common longitudinal axis of opposed knives 22 and 24. As knife 22 advances (toward the right from the position shown in FIG. 9) and knife 24 retracts (toward the right from the position shown in FIG. 9) through the central orifice of disc 96 with fruit 10i impaled between the knives, disc 96 would strip the fruit 10i from knife 24. Then, when knife 22 is subsequently retracted, knife 22 can pull the fruit toward the left (in FIG. 9) away from disc 96.

In another implementation of the FIG. 8 apparatus (and in the modified version of the FIG. 8 apparatus which includes second plate 17a), cam tracks 94 and 98 of the apparatus are shaped so that, as shaft 18 rotates: opposed knives 22 and 24 are advanced (at least substantially simultaneously) into the fruit, to scarify the fruit; and the knives are then retracted (while the knives and fruit rotate together as a unit about a horizontal axis). The scarified fruit may fall from the knives (e.g., into a product chute or bin), or it may remain stuck on one of the retracting knives (to be referred to as the "engaged knife," and which can be either knife 22 or knife 24) until it is stripped from the retracting engaged knife. For example, if knife 24 is the engaged knife, the engaged knife is retracted in a horizontal direction, pulling the fruit into engagement with plate 17 and then continuing to retract completely out from the fruit and through an orifice defined by a disc 96 of plate 17 (as the fruit and disc translate along a segment of a circular path around the horizontal axis). If knife 22 is the engaged knife, the engaged knife is retracted in a horizontal direction, pulling the fruit into engagement with a fruit stripper which strips the fruit from knife 22. For example, in the modified version of the FIG. 8 apparatus in which the fruit stripper is implemented by a second plate 17a, if knife 22 is the engaged knife, the engaged knife is retracted in a horizontal direction, pulling the fruit into engagement with plate 17a and then continuing to retract completely out from the fruit and through an orifice defined by a disc 96a of plate 17a (as the fruit and disc translate along a segment of a circular path around the horizontal axis). In this latter embodiment (and in variations thereon), the knife motions of each pair of opposed knives are typically mirror images of each other, and cams 94 and 98 can be identically shaped (to define cam tracks which are mirror images of each other). Each pair of opposed knives never advances so far as to touch each other, so that there is always at least a nonzero gap distance between them. The gap distance is set, and preferably can be altered, depending upon what is desired (for example, for scarifying smaller fruit the gap distance is preferably relatively small, and for scarifying larger fruit it is larger).

In preferred embodiments, no lubricating oil (or no significant amount of lubricating oil) is allowed to leak from the inventive apparatus into contact with the fruit being processed (before, during, or after scarification). This can be accomplished by positioning the lubricating oil insertion points appropriately. For example, in an implementation of the FIG. 1 apparatus, lubricating oil is dripped on each of cylinders 50 and 51 such that the oil flows through a notch in each cylinder and drips directly onto the cam track (28 or 34) defined by the cylinder, without contacting any of knives 22 and 24 or any of pockets 16, or any other element of the apparatus which directly contacts fruit being processed.

In a class of embodiments, the invention is a method for scarifying fruit, said method including the steps of: (a) advancing at least one pair of opposed knives contemporaneously (e.g., simultaneously) into an article of fruit (e.g., a frozen cranberry or other article of frozen fruit) through at least two locations on the surface of the fruit, such that neither of the knives in the pair advances so far into the fruit that its tip protrudes out from the fruit; and (b) retracting each of the knives out from the fruit, after said each of the knives has reached its deepest point of penetration in the fruit. In typical embodiments in the class, step (a) includes the step of advancing one pair of opposed knives contemporaneously into the article of fruit, each of the knives is aligned to be at least substantially parallel to a longitudinal axis, and each of steps (a) and (b) is performed while translating the knives and fruit along a closed path around the longitudinal axis. In some embodiments in the class, the article of fruit is a frozen cranberry, and each of the knives penetrates not more than a shallow distance (e.g., a distance not greater than about 7 mm, or not greater than about 1 mm or 2 mm in some embodiments) into the frozen cranberry during steps (a) and (b).

In typical preferred embodiments in which each article of fruit is a berry (e.g., a frozen or nonfrozen cranberry), each of the knives penetrates not more than a distance of about 7 mm into the fruit. A typical cranberry may have a diameter in the range from about 10 mm to about 20 mm. The knives (of each pair of opposed knives employed to scarify the fruit) are driven so that they do not meet within the fruit, and typically, so that the tips of the knives are always separated from each other by at least about 3 mm. Typically, it is preferable to drive the knives such that they do not make a hole completely through the fruit. Typically, it is preferable for the knives to penetrate into at least two (e.g., several) locular cavities within the fruit to facilitate good infusion of sugars and/or flavorings, but without making a hole that extends all the way through the fruit.

In another class of embodiments, the invention is a method for scarifying fruit, said method including the steps of:

(a) moving an article of fruit (e.g., a frozen cranberry or other article of frozen fruit) to a loading area between two opposed, cam-driven knives;

(b) advancing the knives contemporaneously (e.g., simultaneously) through two locations on the surface of the fruit, such that neither of the knives advances so far into the fruit that its tip protrudes out from the fruit; and (c) retracting each of the knives out from the fruit, after said each of the knives has reached its deepest point of penetration in the fruit.

In some embodiments, step (c) includes the steps of:

(d) translating the fruit to an element (e.g., a pocket or disc), where the element defines an orifice which extends through said element;

(e) retracting a first one of the knives out from the fruit through the orifice of the element; and (f) after step (e), retracting a second one of the knives out from the fruit.

Step (f) may include steps of translating the fruit, with the second one of the knives engaged therewith, into engagement with a stripping element, and retracting the second one of the knives out from the fruit while said fruit is engaged with the stripping element.

In some embodiments, each of the knives is aligned to be at least substantially parallel to a longitudinal axis, and each of steps (b) and (c) is performed while translating the knives and fruit along a closed path around the longitudinal axis. In some embodiments, the article of fruit is a frozen cranberry, and each of the knives penetrates not more than a shallow distance (e.g., a distance not greater than about 7 mm, or not greater than about 1 mm or 2 mm in some embodiments) into the frozen cranberry during steps (b) and (c). In typical preferred embodiments in which each article of fruit is a berry (e.g., a frozen or nonfrozen cranberry), each of the knives penetrates not more than a distance of about 7 mm into the fruit. The knives are driven so that they do not meet within the fruit, and typically, so that the tips of the knives are always separated from each other by at least about 3 mm. Typically, it is preferable to drive the knives such that they do not make a hole completely through the fruit. Typically, it is preferable for the knives to penetrate into at least two (e.g., several) locular cavities within the fruit to facilitate good infusion of sugars and/or flavorings, but without making a hole that extends all the way through the fruit.

It is contemplated that any of a wide variety of fruits may be processed by the inventive apparatus or in accordance with the inventive method. Frozen cranberries are processed (i.e., scarified) by preferred embodiments the inventive apparatus or in accordance with preferred embodiments the inventive method.

The foregoing is merely illustrative and explanatory of embodiments of the inventive method and apparatus. Various changes in the component sizes and shapes, and other details of the embodiments described herein may be within the scope of the appended claims.

What is claimed is:

1. An apparatus for scarifying fruit, including:
at least one pair of opposed knives; and
a knife-driving assembly coupled to the knives and configured to advance the knives of the pair contemporaneously into an article of fruit through at least two locations on the surface of the fruit, such that neither of the knives advances so far into the fruit that its tip protrudes out from the fruit, wherein the knife-driving assembly is also configured to retract each of the knives out from the fruit, after said each of the knives has reached its deepest point of penetration in the fruit, wherein the knife-driving assembly is configured to advance and retract the knives in a horizontal direction.

2. The apparatus of claim 1, also including:

a frame; and a drive shaft having a longitudinal axis, wherein the drive shaft is rotatably mounted to the frame, the knife-driving assembly is coupled to the drive shaft and defines cam tracks, and the knives are coupled to the cam tracks such that rotation of the drive shaft causes the knives to translate around the drive shaft while advancing into the fruit and retracting out from the fruit in directions at least substantially parallel to the longitudinal axis.

3. The apparatus of claim 2, wherein each of the knives is aligned at least substantially parallel to the longitudinal axis, and the knife-driving assembly is configured to advance and retract the knives at least substantially parallel to the longitudinal axis while translating the knives along a closed path around the longitudinal axis.

4. The apparatus of claim 3, also including a pocket element configured to define a set of N pockets, where N is an integer, wherein the apparatus includes N pairs of cam-driven, opposed knives, each of said pairs of opposed knives aligned with a different one of the pockets, and wherein the knife-driving assembly is configured to advance and retract the knives of each of said pairs of opposed knives at least substantially parallel to the longitudinal axis while translating the knives along a closed path around the longitudinal axis.

5. The apparatus of claim 4, also including a loading assembly configured to translate the fruit to a loading area between advancing knives of one of said pairs of opposed knives, whereby the advancing knives can advance contemporaneously into engagement with the fruit in the loading area while the knife-driving assembly translates said advancing knives along the closed path.

6. The apparatus of claim 2, wherein the knife-driving assembly includes a first sub-assembly defining a first cam track and second sub-assembly defining a second cam track, and wherein a first knife of each said pair of opposed knives is coupled to the drive shaft and the first cam track such that rotation of the drive shaft causes the first knife to translate around the drive shaft while advancing and retracting parallel to the longitudinal axis, and a second knife of each said pair of opposed knives is coupled to the drive shaft and the second cam track such that rotation of the drive shaft causes the second knife to translate around the drive shaft while advancing and retracting parallel to the longitudinal axis.

7. The apparatus of claim 1, wherein the article of fruit is an article of frozen fruit, and the knife-driving assembly is configured to cause each of the knives to penetrate not more than a shallow distance into the frozen fruit, where the shallow distance is not greater than about 7 mm.

8. The apparatus of claim 7, wherein the shallow distance is not greater than about 1 mm.

9. The apparatus of claim 1, wherein the knife-driving assembly is configured to advance the knives simultaneously into the article of fruit.

10. The apparatus of claim 1, also including a pocket element defining at least one pocket, and wherein the knife-driving assembly is configured to advance and retract the knives at least substantially parallel to the longitudinal axis while translating said knives along a closed path around the longitudinal axis, such that the pair of opposed knives can translate the fruit into engagement with the pocket while said fruit is held between said pair of opposed knives, and the knife-driving assembly is configured to retract a first one of the knives out from the fruit while a second one of the knives holds the fruit against the pocket, and to retract the second one of the knives after the first one of the knives has retracted out from the fruit.

11. The apparatus of claim 10, also including a stripper element mounted to the frame, wherein the stripper element is configured to strip the fruit from the second one of the knives while the knife-driving assembly retracts said second one of the knives.

12. The apparatus of claim 1, also including an element defining at least one disc, wherein each said disc defines an orifice extending through the disc, and wherein the knife-driving assembly is configured to advance and retract the knives at least substantially parallel to the longitudinal axis while translating said knives along a closed path around the longitudinal axis, such that the pair of opposed knives can translate the fruit into engagement with the disc while said fruit is held between said pair of opposed knives, and the knife-driving assembly is configured to retract a first one of the knives out from the fruit while a second one of the knives holds the fruit against the disc, and to retract the second one of the knives after the first one of the knives has retracted out from the fruit.

13. The apparatus of claim 1, wherein at least one of the knives is spring-loaded to the knife-driving assembly.

14. The apparatus of claim 1, wherein at least one of the knives includes:

a member having a concave distal surface, wherein the member is coupled to the knife-driving assembly; and a pin mounted to the member such that a tip of the pin protrudes distally from the concave distal surface.

15. The apparatus of claim 14, wherein the pin is mounted to the member such that the tip of the pin protrudes distally from the concave distal surface by an amount in a range from about 1 mm to about 7 mm.

16. The apparatus of claim 14, wherein the pin is spring-biased in an extended state to the knife-driving assembly, such that force exerted by a fruit on the pin during advancement of said at least one of the knives against the fruit can move the pin from its extended state, thereby limiting the force exerted by the pin on the fruit, and such that the pin can relax toward its extended state when said at least one of the knives retracts out of engagement with the fruit.

* * * * *